(12) United States Patent
Biswas et al.

(10) Patent No.: US 7,860,098 B1
(45) Date of Patent: Dec. 28, 2010

(54) MECHANISMS FOR USING NAT AT A SESSION BORDER CONTROLLER

(75) Inventors: Kaushik P. Biswas, San Jose, CA (US); Vinay Jayant Pande, San Jose, CA (US); Jayesh Chokshi, Cupertino, CA (US); Siva S. Jayasenan, Cupertino, CA (US); Vikas Butaney, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 11/511,629

(22) Filed: Aug. 28, 2006

(51) Int. Cl.
H04L 12/56 (2006.01)

(52) U.S. Cl. .................. 370/392; 370/401; 370/352; 709/227

(58) Field of Classification Search .......... 370/392, 370/395.2, 389, 401, 352, 400
See application file for complete search history.

(56) References Cited

U.S. PATENT DOCUMENTS

| | | | | |
|---|---|---|---|---|
| 2006/0098663 | A1* | 5/2006 | Shore | 370/401 |
| 2007/0019619 | A1* | 1/2007 | Foster et al. | 370/352 |
| 2007/0078986 | A1* | 4/2007 | Ethier et al. | 709/227 |
| 2007/0253418 | A1* | 11/2007 | Shiri et al. | 370/392 |
| 2008/0019370 | A1* | 1/2008 | Riley | 370/392 |

OTHER PUBLICATIONS

Schulzrinne, H. et al., "RTP Payload for DTMF Digits, Telephony Tones and Telephony Signals," Network Working Group, RFC 2833, May 2000, pp. 1-24, http://www.faqs.org/rfcs/rfc2833.html.

Rosenberg, J. et al., "SIP: Session Initiation Protocol," Network Working Group, RFC 3261, Jun. 2002, pp. 1-211, http://www.faqs.org/rfcs/rfc3261.

Hautakorpi, J. et al., "SIP—Unfriendly Functions in Current Communication Architectures," SIPPING Working Group, Internet Draft, Jul. 18, 2005, pp. 1-9, http://tools.ietf.org/id/draft-camarillo-sippig-sbc-funcs-01.txt.

(Continued)

*Primary Examiner*—Man Phan
*Assistant Examiner*—Nourali Mansoury
(74) *Attorney, Agent, or Firm*—Weaver Austin Villeneuve & Sampson LLP (57) ABSTRACT

Disclosed are apparatus and methods for managing session data in a session border controller (SBC), where the session data is sent from a first node, such as a first phone, to a second node, such as a registrar or second phone. In general, embodiments of the present invention support SBC functionality by managing sessions through the SBC without implementing a terminate and regenerate of the sessions, but rather by intercepting packets destined to the second node and efficiently handling such functionality in the forwarding-path. Also in deployments where the endnodes require NAT (network address translation), mechanisms are provided in the SBC to perform NAT on the addresses embedded in the payload of the session data. In other aspects, mechanisms for keeping the sessions or NAT entries alive are facilitated at the SBC, even when an endnode has a expiration time that differs an expiration time of another device, such as a registar device. Other embodiments allow the actual media packets to flow through the SBC (e.g., for security, accounting, etc) while allowing two endnodes to utilize a same private address or domain.

19 Claims, 8 Drawing Sheets

OTHER PUBLICATIONS

Hautakorpi, J. et al., "SIP—Unfriendly Functions in Current Communication Architectures," SIPPING Working Group, Internet Draft, Sep. 26, 2005, pp. 1-12, http://tools.ietf.org/id/draft-camarillo-sipping-sbc-funcs-02.txt.

Rosenberg, J. et al., "Considerations for Selection of Techniques for NAT Traversal," Network Working Group, Internet Draft, Feb. 13, 2005, pp. 1-20, http://tools.ietf.org/html.draft-iab-nat-traversal-consideratins-00.

"Session Border Controllers: Delivering Interactive Communications Across IP Network Borders," Acme Packet Inc., White Paper, Feb. 19, 2003, pp. 1-11, http://www.acmepacket.com.

"Overview of Cisco Multiservice IP-to-IP Gateways," Cisco Multiservice IP-to-IP Gateway Application Guide, 2006, 21 pages.

Functionality of Existing Session Border Controller (SBC), Network Working Group, Internet Draft, Feb. 2005, pp. 1-9, http://polyphase.ca/drafts/draft-camarillo-sipping-sbc-funcs-00.html.

\* cited by examiner

MECHANISMS FOR USING NAT AT A SESSION BORDER CONTROLLER

BACKGROUND OF THE INVENTION

The present invention relates to methods and apparatus for processing session data within a computer network. More specifically, it relates to mechanisms for performing network address translation on session data transmitted within such computer network.

Session Border Controllers (SBC's) are becoming increasingly popular for facilitating devices on either sides of the Session Border Controllers to remain unaware of each others' existence, particularly in Session Initiation Protocol (SIP) deployments whereby the inside user-agents (UAs) are configured with the SBC's inside-address as its proxy/registrar address and directs all signaling traffic to the SBC, which in turn ensures that this traffic reaches the actual proxy/registrar (as configured in its database) and vice-versa.

There are solutions like IP-IP GW that terminate and regenerate sessions at the SBC. When a call signaling packet is received from a first endnode at the SBC, the SBC performs several operations that require a significant amount of resources, especially as the number of sessions handled by such SBC increases. For each call signaling flow, the SBC closes and manages the stack associated with the session that is conducted between the first endnode and the SBC and also creates and manages a new stack for the session that is conducted between the SBC and the second endnode. That is, another socket needs to be opened for the session between the SBC and the second node.

Another problem with the typical SBC arrangement is that each endnode may be associated with a router having NAT (network address translation) capability. For instance a user may have their own home network router with NAT. In a session based flow, addresses are often utilized in a session data's payload, as well as the header. Accordingly, mechanisms for handling embedded addresses would have to be deployed in each endnode's individual router. Such a mechanism is typically referred to as an application level gateway (ALG) that is configured to handle a particular application's payload format. Since each application requires a custom ALG to handle the differently formatted payloads, employment of ALG's in each endnode's router would entail significant overhead.

Another problem with conventional SBC schemes occurs when an endnode's expiration time for timing out of its session differs from the expiration time desired by the registrar server. Currently, no mechanisms exist for handling disparate expiration times. Currently, the SBC merely sends refresh messages from each endnode to the registrar based on such endnode's configured expiration time. The frequency of such refresh messages may be undesirably high for the Registrar, especially when the number of endnodes is high. A high frequency of refresh packets may cause the registrar to become overloaded and operate inefficiently or even lockup.

Accordingly, improved mechanisms for managing sessions through an SBC without requiring termination and regeneration of session would be beneficial. Additionally, it would be desirable that such session management schemes would reduce or eliminate the need for an endnode's associated router to handle embedded addresses, and would also handle disparate expiration times between an endnode and a registrar device.

DESCRIPTION OF EXAMPLE EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

OVERVIEW

Apparatus and methods for managing session data in a session border controller (SBC) are disclosed, where the session data is sent from a first node, such as a first phone, to a second node, such as a registrar or second phone. In general, embodiments of the present invention support SBC functionality by managing sessions through the SBC without implementing a terminate and regenerate of the sessions, but rather by intercepting packets destined to the second node and efficiently handling such functionality in the forwarding-path. Also in deployments where the endnodes require NAT (network address translation), mechanisms are provided in the SBC to perform NAT on the addresses embedded in the payload of the session data. In other aspects, mechanisms for keeping the sessions or NAT entries alive are facilitated at the SBC, even when an endnode has a expiration time that differs an expiration time of another device, such as a registar device.

Other embodiments allow the actual media packets to flow through the SBC (e.g., for security, accounting, etc) while allowing two endnodes to utilize a same private address or domain.

Example Network

Figure 1:
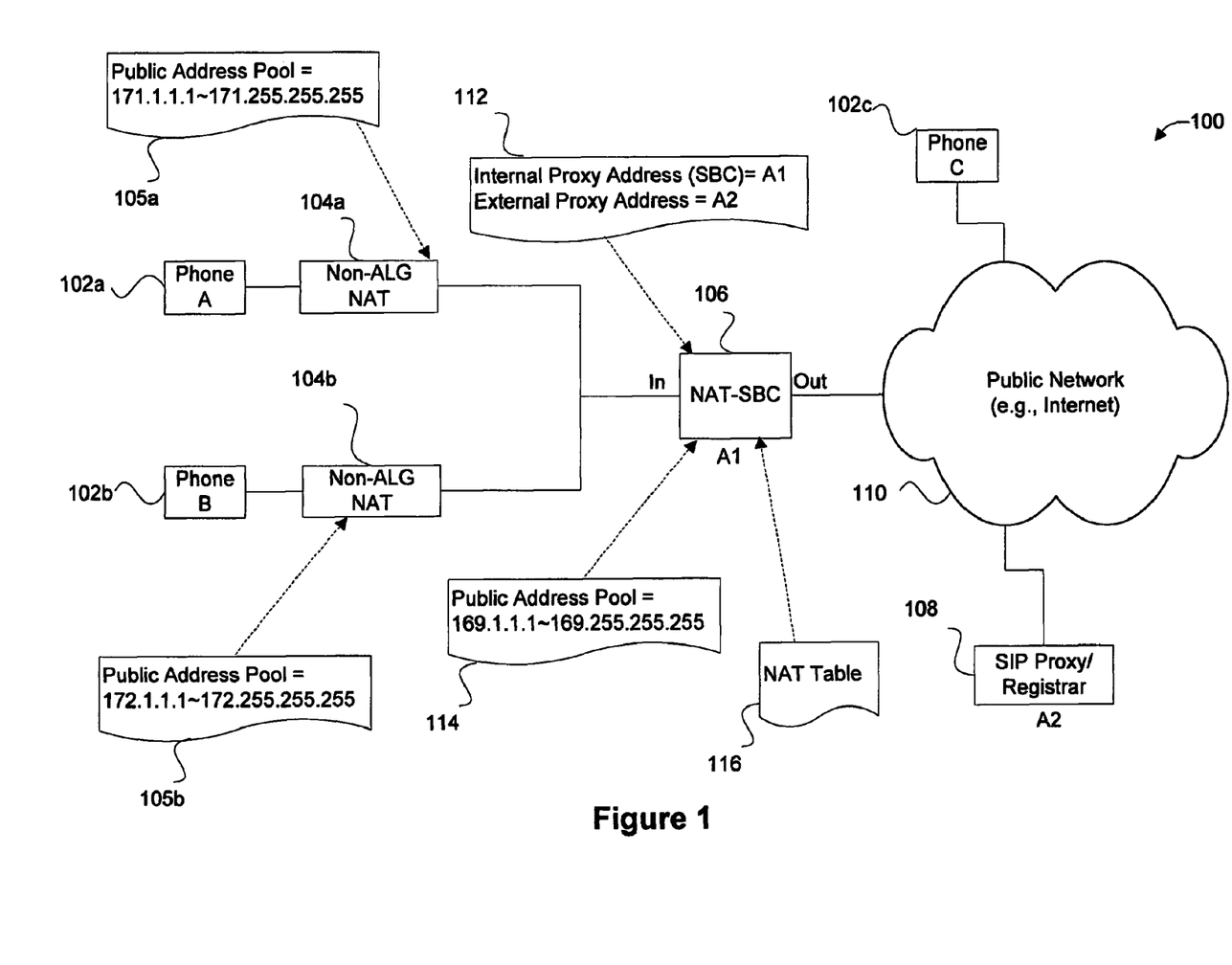
FIG. 1 is a network in which embodiments of the present invention may be implemented in accordance with one embodiment of the present invention.

FIG. 1 is a network in which embodiments of the present invention may be implemented in accordance with one embodiment of the present invention. Phone A (102a) and phone B (102b) are each configured to send session data to a NAT-SBC 106 through their individual Non-ALG NAT devices 104a and 104b, respectively. Although each Non-ALG NAT 104 does not include mechanisms for analyzing and translating embedded addresses, each Non-ALG NAT is associated with its own public address pool to be utilized to translate a header's inside private addresses into public addresses, and visa versa. As shown, public address pool 105a having address range 171.1.1.1 through 171.255.255.255 is associated with Non-ALG NAT 104a, while public address pool 105b having address range 172.1.1.1 through 172.255.255.255 is associated with Non-ALG NAT 104b. Bindings between public and private addresses for a particular endnode or phone may be stored in a NAT Table (not shown) associated with the particular endnode's Non-ALG NAT 104.

In general, NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network.

When a local computer attempts to communicate with a computer outside the local network, the intermediary device maps the local computer's IP address to one of the intermediary device's assigned globally unique IP addresses. The intermediary device than replaces the local computer's address with this globally unique IP address enabling the local computer to communicate with the outside computer. If the intermediary device is assigned only one globally unique IP address, then it needs to share this globally unique IP address amongst all the local computers for which it is acting as an agent. Thus the intermediary device would need to modify the TCP/UDP ports for the traffic from the local computers such that it can uniquely map the tuple (local address, local TCP/UDP port number) to the globally unique IP address and assigned TCP/UDP port number. This is called network address port translation (NAPT). The term NAT is used herein in a generalized form to mean both network address translation (NAT) and network address port translation (NAPT).

The NAT-SBC 106 is also configured to translate addresses in the header, as well as the payload, based on a proxy binding 112 and a public address pool 114. The proxy binding includes an Internal Proxy address A1 assigned to the NAT-SBC and an External Proxy address A2 assigned to a proxy or registrar device 108. The NAT-SBC is configured to serve as a proxy for the actual proxy or Registrar 108. Accordingly, session data from each phone is typically directed to the NAT-SBC's address A1 and then the NAT-SBC forwards such session data to the actual proxy or registrar device 108 after the session data is processed as explained further below. Typically, the NAT-SBC has its own domain in the range 169.1.1.1 through 169.255.255.255. Thus, the NAT-SBC may also be configured to translate public addresses generated by each Non ALG NAT into public addresses from its public address pool 114 having a range between 169.1.1.1 and 169.255.255.255. Bindings between inside and outside addresses with respect to the NAT-SBC may be stored in a NAT Table 116 associated with NAT-SBC 106.

While phones A and B may be coupled to the inside NAT-SBC 106, other phones, such as phone C (102c), may be coupled with the outside interface of such NAT-SBC 106, for example, via one or more local network(s) and public networks (e.g., Internet 110). SIP Proxy or Registrar 108 is also coupled with public network 110 although any suitable registrar device for managing sessions may be utilized, depending on the particular call signaling protocol.

In general, the NAT-SBC is configured to translate the header and payload of session packets so as to not terminate and generate each session. The NAT-SBC translates the appropriate addresses in the packet and then forwards the translated packet towards its destination. An address translation as discussed herein may include translation of an IP address and/or a port value. The translation generally does not affect other portions of the packet and, therefore, most of the packet information is maintained upon forwarding. Since the translated and forwarded packet retains most of its information, security and other information may also be reliably maintained. This translation and forwarding scheme may be accomplished in any suitable manner.

Example Implementations

Figure 2A:
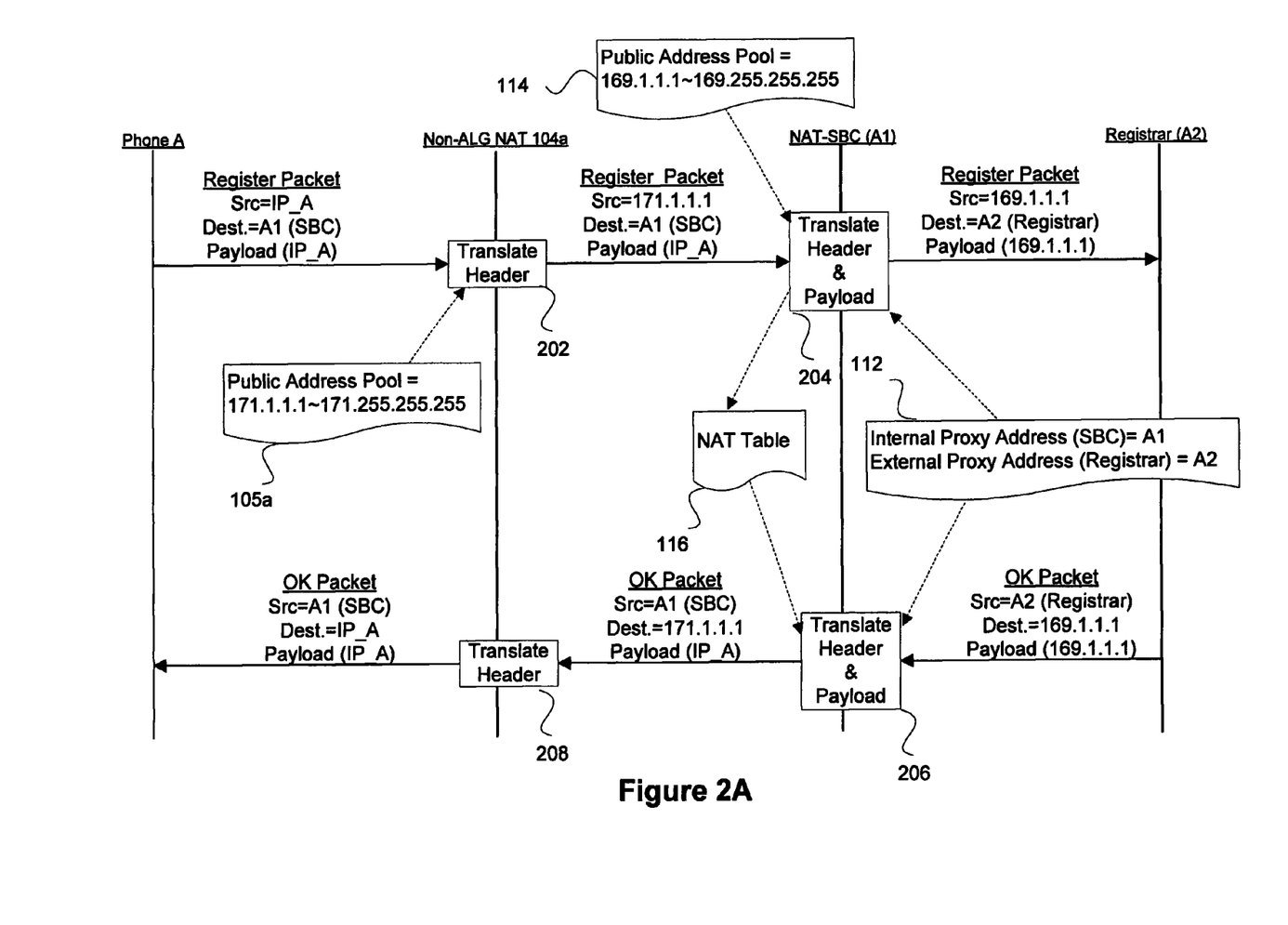
FIGS. 2A and 2B illustrate communication diagrams for registering phone A and phone B in accordance with one implementation of the present invention.

FIGS. 2A and 2B illustrate communication diagrams for registering phone A and phone B, respectively, in accordance with one implementation of the present invention. As shown in FIG. 2A, phone A sends a register packet having a source address equal to IP_A and a destination address equal to A1, which is the address of the NAT-SBC 106 of FIG. 1. The source address IP_A of phone A is also contained within the payload, e.g., as a caller identifier.

The Non-ALG NAT 104a receives this register packet and then translates only the header in operation 202. Accordingly, the register packet now has a source address equal to 171.1.1.1, which with obtained from the public address pool 105a of the Non-ALG NAT 104a. The Non-ALG NAT does not translate any addresses in the payload. The source address IP_A, which is the private address for phone A, remains untranslated in the payload.

This register packet is then received by the NAT-SBC 106. The NAT-SBC then translates the header and payload addresses in operation 204. Translation of the header destination address is accomplished based on a binding 112 between an internal proxy address for the SBC that is equal to A1 and an external proxy address for the registrar that is equal to A2. The proxy binding 112 can be preconfigured in the SBC or configured using any suitable command interface (e.g., command language interface or CLI). Translation of the header source from 171.1.1.1 to 169.1.1.1 is based on the public address pool 114 of the NAT-SBC.

A public address that is generated by the Non_ALG NAT and is received in a packet on an inside interface of the SBC is referred to as a public-inside address, while the public address that is generated by the SBC and output in a packet from the outside interface of the SBC is referred to as public-outside address. At any time during this translation and/or forwarding process, one or more binding(s) are also formed in one or more NAT Table(s), e.g., table 116, so as to associate phone A's private address, public-inside address, and public-outside address.

The payload of the register packet that is received into the inside interface of the SBC is also translated from the private address for phone A into the public-outside address for phone A that was obtained from the public address pool 114. The translated register packet is output from the outside interface of NAT-SBC to the registrar. This translated and forwarded register packet now has a source address equal to 169.1.1.1 (obtained from public address pool 114), a destination equal to A2 (which corresponds to the registrar), as well as a public-outside address 169.1.1.1, which corresponds to phone A in the payload. Substantially all of the remaining portions of the register packet remain unchanged thereby retaining significant information, such as credential information.

After the registrar receives this translated register packet, the registrar then sends an OK packet having a source address equal to A2 and a destination address equal to 169.1.1.1, which corresponds to the public address for phone A. The registrar retains the association between the phone A's public address and other calling information, such as a phone number for phone A. The OK packet also contains public address information for phone A within the payload.

The NAT-SBC receives this OK packet and translates the header and payload in operation 206 based on one or more binding(s) previously stored in the NAT table 116 for phone A, as well as proxy binding 112. The NAT-SBC then outputs the OK packet having a source address equal to A1 and a destination address equal to 171.1.1.1, which corresponds to the public-inside address for phone A. The payload now contains only private address IP_A for phone A. The SBC has translated the destination address from its public-inside address for phone A, while it has translated the payload address for phone A into its corresponding private address. This is done so that the Non-ALG NAT only has to translate the header and not the payload.

This OK packet is received by the Non-ALG NAT 104a, which merely translates the header in operation 208. Accordingly, the OK packet then has a source address equal to A1 and a destination address equal to IP_A. The private address IP_A in the payload remains untranslated by the Non-ALG NAT 104a. This translated OK packet is sent to phone A.

Figure 2B:
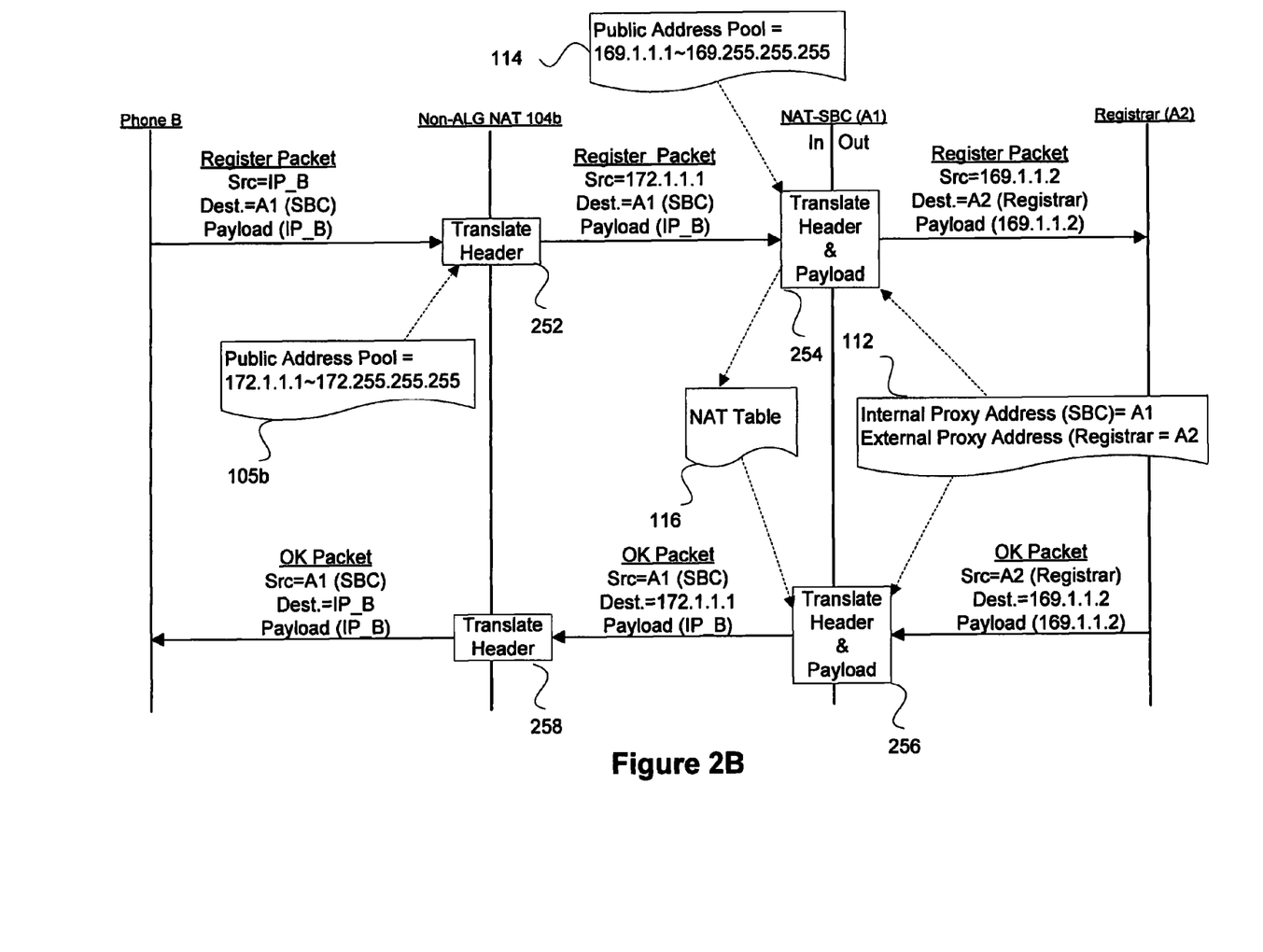

As shown in FIG. 2B, phone B sends a register packet having a source address equal to IP_B and a destination address equal to A1, which corresponds to the NAT-SBC. The private address IP_B for phone B is also contained in the payload in one or more fields depending on the particular application utilized. The Non-ALG NAT 104b then receives this register packet from phone B and translates the header in operation 252. The register packet then has a source address equal to 172.1.1.1, which was obtained from the public address pool 105b for Non-ALG NAT 104b. The private address for phone B IP_B remains untranslated in the payload.

The NAT-SBC then receives this register packet and translates the header and payload in operation 254. The register packet then contains a source address equal to 169.1.1.2, which was obtained from the public address pool 114, and destination address equal to A2 (for registrar), as well as public address 169.1.1.2 for phone B in the payload.

This register packet is received by the registrar. The registrar then sends an OK packet having a source address equal to A2, a destination address and payload address equal to 169.1.1.2 that corresponds to phone B. The NAT-SBC receives this OK packet and translates the header and payload in operation 256. The translated OK packet that is sent from the NAT-SBC then contains source address equal to A1 and a destination address equal to 172.1.1.1, as well as a private address IP_B for phone B within the payload. The Non-ALG NAT 104b then translates only the header and not the payload address in operation 258. It should be noted that the Non-ALG NAT 104b does not have to translate the payload address because the SBC has already handled such embedded address. The final OK packet then contains a source address equal to A1, and a destination and payload address equal to IP_B. This OK packet is received by phone B.

Figure 3:
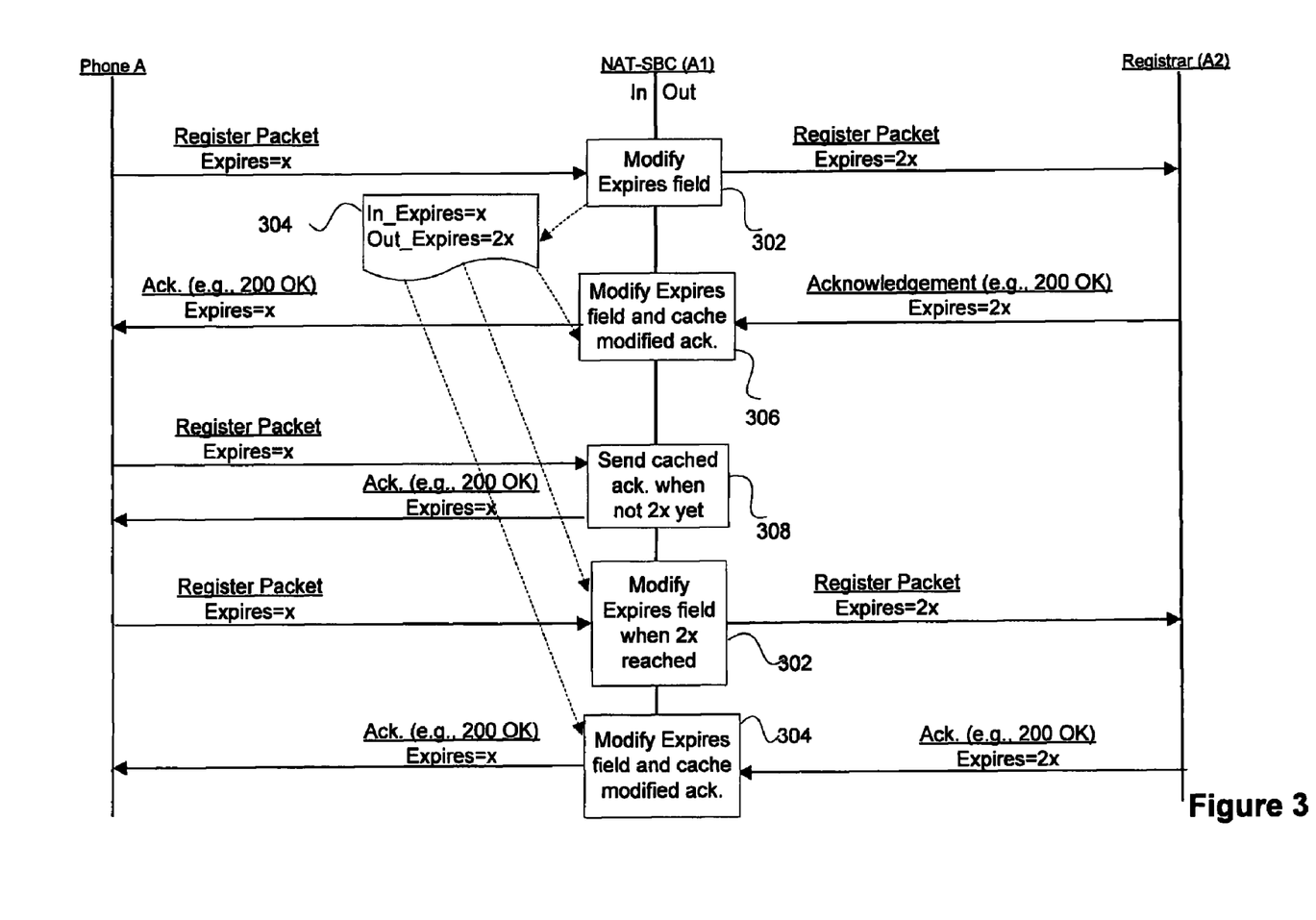
FIG. 3 is a communication diagram illustrating a throttling mechanism in according with one implementation of the present invention.

FIG. 3 is a communication diagram illustrating a throttling mechanism in according with a specific implementation of the present invention. This throttling mechanism will be illustrated with respect to a register packet sent by phone A. Of course, such throttling mechanisms may be applied to any suitable number of phones. Initially, phone A sends a register packet having an Expires Field equal to X. In this aspect, the SBC can be configured with a different Expires value, such as 2X, for the registrar. For example, the registrar may desire to have less frequent register packets to be sent to it to keep the sender's session alive. The registrar's actual Expire value may be any suitable value. In the present case, the registrar's Expire value is twice the value used by the end node, phone A. However, the registrar does not have to use whole multiples of endnode's value.

The NAT-SBC receives the registrar packet from phone A and modifies the Expires Field in operation 302. The NAT-SBC is configured with an Out_Expires Field equal to 2X for the registrar in this example. An association between the In_Expires Field for phone A that is equal to X and the Out_Expires Field that is equal to 2X is stored as binding 304 by the NAT-SBC. A register packet having a modified Expires Field equal to 2X is then sent to the registrar. The registrar sends an acknowledgement, e.g., 200 OK, having an Expires Field equal to 2X.

The NAT-SBC receives this acknowledgement and modifies the Expires Field and caches the modified acknowledgement in operation 306. The acknowledgement that is cached can preferably be post translation. In other words, the header has already been translated by the NAT-SBC, as well as any payload. A modified acknowledgement having an Expires Field equal to X is also sent to the phone A.

When the phone A sends a next register packet with an Expires Field equal to X and the Expires time 2X has not yet being approached, the NAT-SBC sends the cached acknowledgement back to phone A in operation 308. When the 2X time is almost reached and a register packet has been received by the NAT-SBC, this registration packet is then modified and sent to the registrar so that the register packet contains an Expires Field equal to 2X. In one implementation, the register packet is sent if the time that has passed is between X and 2X. The second register packet has been sent at a time between X and 2X so this second register packet is sent to the registrar after modification of the Expires time. The returned acknowledgement with the Expires equal to 2X is then modified and cached in operation 304 by the NAT-SBC. The modified acknowledgement with the 2X Expires field is also sent to the phone A.

Figure 4A:
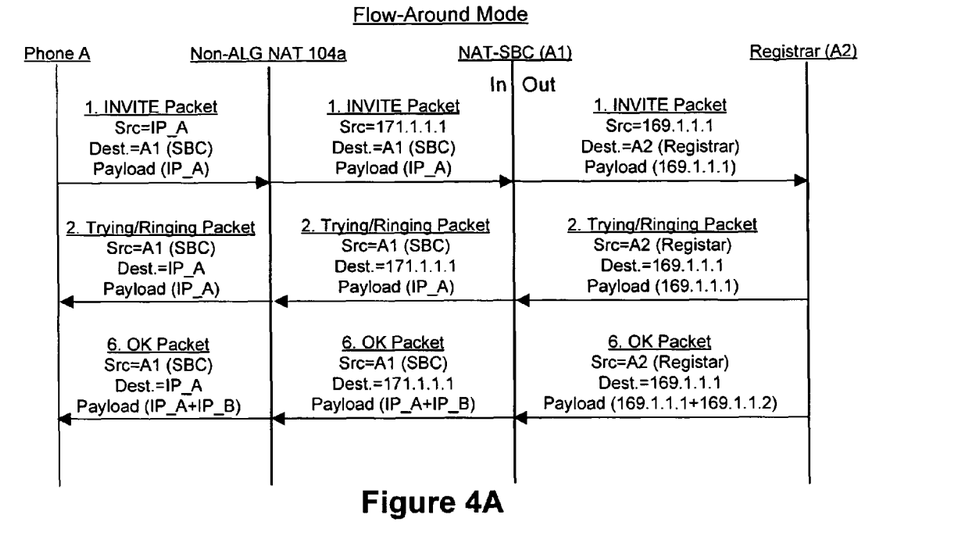
FIGS. 4A through 4C illustrate communication diagrams for a Flow-Around Mode in accordance with a first aspect of the present invention.
Figure 4B:
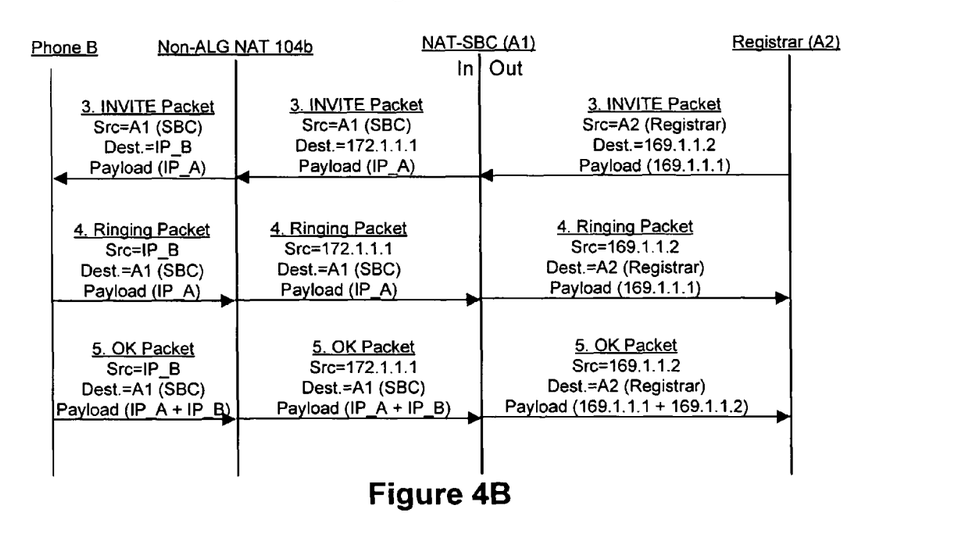
Figure 4C:
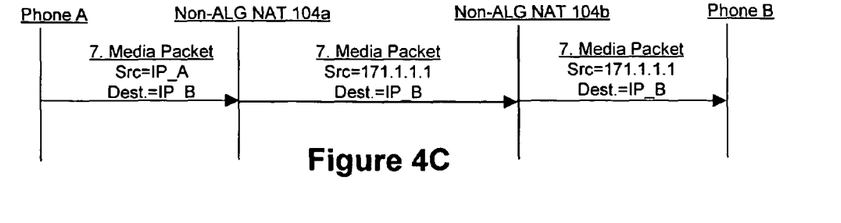
Figure 5A:
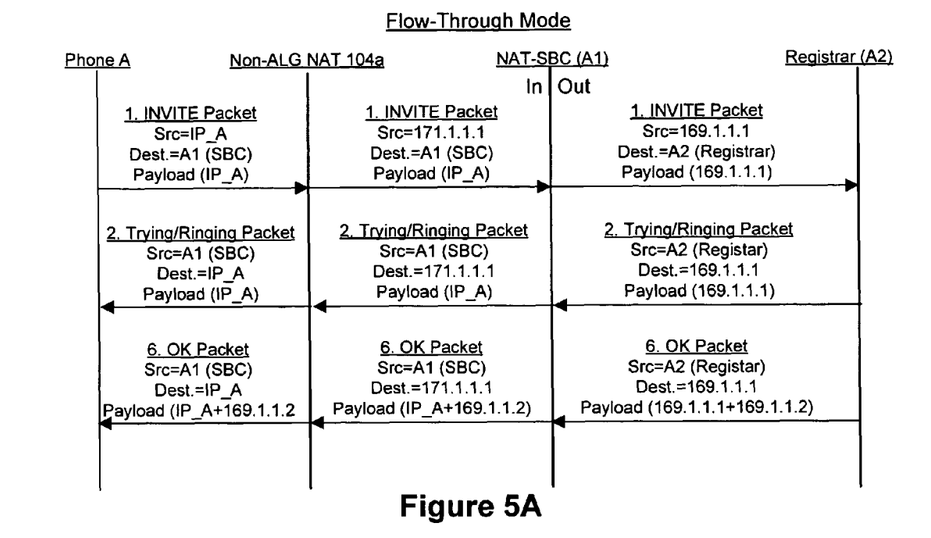
FIGS. 5A through 5C illustrate communication diagrams for a Flow-Through Mode in accordance with a second implementation of the present invention.
Figure 5B:
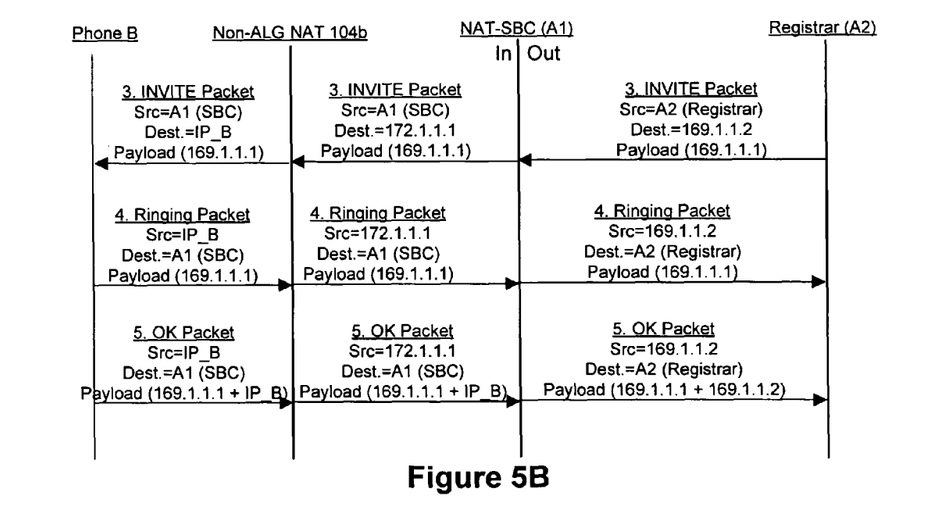
Figure 5C:
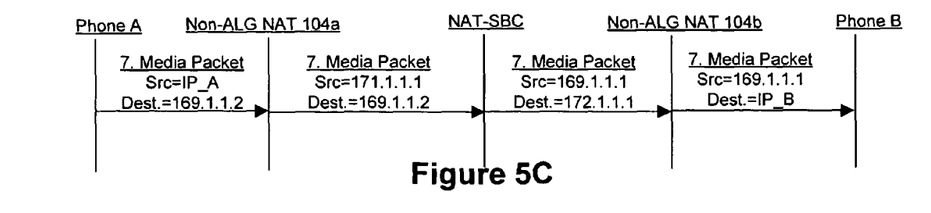
Figure 6:
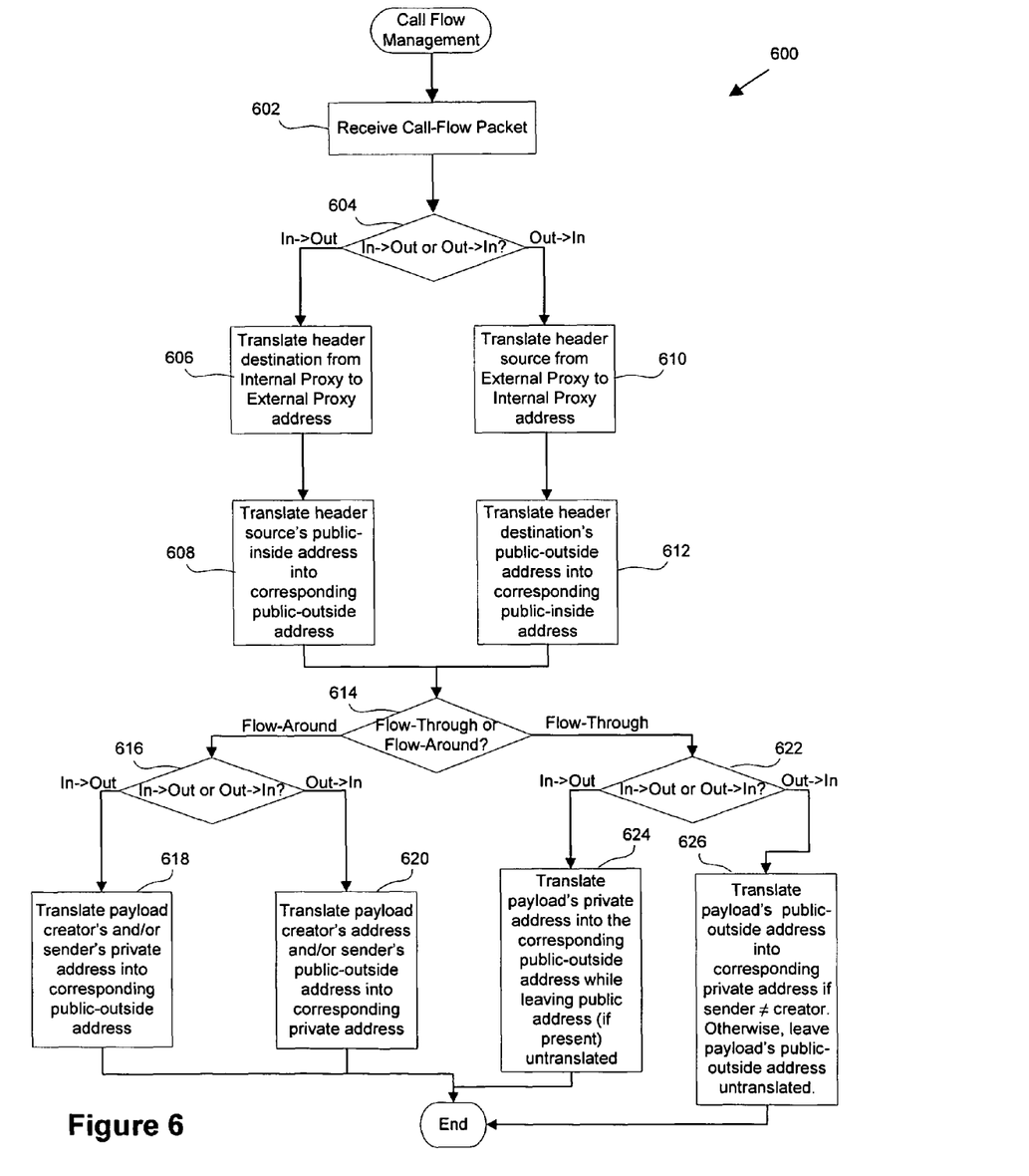
FIG. 6 is a flow chart illustrating a call flow management procedure for handling two modes in accordance with one embodiment of the present invention.

After a particular phone has registered, the call signaling and media packets may be handled in two different approaches. Of course, the throttling mechanisms described above may continue to operate during call flow management. FIGS. 4A through 4C illustrate communication diagrams for a Flow-Around Mode, while FIGS. 5A through 5C illustrate communication diagrams for a Flow-Through Mode in accordance with two implementations of the present invention. FIG. 6 is a flow chart illustrating a call flow management procedure 600 for handling both modes in accordance with one embodiment of the present invention. Both communication diagrams will be described in conjunction with the flow of FIG. 6.

Referring to FIG. 4A, phone A initially sends an INVITE packet in step 1 having a source equal to IP_A, a destination address equal to A1, and private address IP_A for phone A within the payload. This INVITE packet is received by a Non-ALG NAT 104a that translates the header. Accordingly, the INVITE packet sent out from Non-ALG NAT 104a contains a translated source address equal to 171.1.1.1. The NAT-SBC recognizes the source address 171.1.1.1 as a public-inside address for phone A.

Referring to FIG. 6, the call flow packet (e.g., INVITE packet) is received in operation 602 by the NAT-SBC. It is then determined whether the packet is going from the inside to the outside, or from the outside to the inside in operation 604. In the present example of the INVITE packet, the INVITE packet is going from the inside to the outside with respect to the NAT-SBC. Accordingly, the header destination address is translated from the internal proxy to the external proxy address in operation 606. As shown is FIG. 4A, the destination address is translated from the internal proxy address A1 to the external proxy address A2. Referring back to FIG. 6, the header source public-inside address is translated into a corresponding public-outside address in operation 608. Thus, as shown in FIG. 4A, the header source address is translated from public-inside address 171.1.1.1 to public-outside address 169.1.1.1.

In handling the different modes, the NAT-SBC then may determine whether Flow-Through or Flow-Around Mode is being implemented in operation 614. This determination may utilize any suitable mechanism. In one implementation, the SBC is configured with particular modes for all devices or a subset of devices. A Flow-Through mode may be configured when two inside phones share a same domain and possible a same private address. For instance, when phone A shares a same domain 10.1.1.1/x with phone B, the Flow-Through mode may be used. When phone A and Phone B have unique domains with respect to each other, they may implement a Flow_Around mode as described further below.

In the example of FIGS. 4A~4C, a Flow-Around Mode is being implemented. Thus, after translation of the header, the NAT-SBC may again determine whether the packet is flowing from the inside to the outside or visa versa in operation 616. The INVITE packet of step 1 is flowing from the inside to the outside of the SBC. Accordingly, the private address for the creator and/or the private address for the sender of the packet that is in the payload are translated into the corresponding public-outside address in operation 618.

The creator is defined as the originator of the payload address. In an SIP example, phone A creates the initial INVITE payload with its own address IP_A in step 1 and this INVITE is sent to phone B by the registrar in step 3. Phone B returns at least a portion of the same payload having phone A's address in the Ringing and OK packet in steps 2, 4, 5, and 6. The Registrar also returns the address for phone A that was initially generated or created by phone A in the payload of a Trying packet in step 2. Thus, in these packet examples, the payload address that corresponds to phone A was created by phone A since phone A generated the initial INVITE. While phone A sends the initial INVITE packet in steps 1 and 3, phone B or the registrar sends the other packets in steps 2, 4, 5, and 6. Phone B is the creator and sender of the payload address for itself in the OK packet of steps 5 and 6. For each particular packet, the creator of an address may be simply determined to be the phone that corresponds to the particular address, while the sender is determined from the source address of the header.

In the INVITE example of step 1 of FIG. 4A, the private address IP_A corresponds to both the creator and the sender of the packet, i.e., phone A. Thus, this private address IP_A for the creator and the sender is translated into the public-outside address 169.1.1.1.

This translated INVITE packet is then received by the registrar. The registrar may then send back a Trying or Ringing Packet in step 2 of FIG. 4A. This packet has a source address equal to A2 and a public-outside address 169.1.1.1 for the destination address, as well as the payload. In this example, the payload public-outside address corresponds to the creator of the original INVITE packet, phone A. This Trying or Ringing Packet is then received by the NAT-SBC from the outside and destined for the inside interface of the SBC. Thus, the header source is translated from the external proxy to the internal proxy address in operation 610. The header destinations public-outside address is also translated into the corresponding public-inside address in operation 612.

Additionally, the payload creator address is translated from the public-outside address into the corresponding private address for the creator (i.e., phone A) in operation 620 for the Flow-Around Mode. Thus, the Trying or Ringing Packet output by the NAT-SBC has a source address equal to A1, and a destination address equal to 171.1.1.1 for phone A, and a creator's address in the payload equal to IP_A for phone A. The Non-ALG NAT 104A then receives this Trying or Ringing Packet and translates only the header and does not have to translate the embedded address for phone A. The Trying or Ringing Packet received by phone A then has a source address equal to A1 and a destination address equal to IP_A.

In the meantime, the registrar also sends an INVITE packet towards phone B in step 3 which is illustrated in FIG. 4B. This INVITE packet has a source address equal to A2 and a destination address equal to 169.1.1.2, which corresponds to phone B. The payload has the public-outside address for phone A, which is equal to 169.1.1.1.

When the NAT-SBC receives this INVITE packet, it is going from the outside to the inside in a Flow-Around Mode. Accordingly, the header source is translated from an external proxy to internal proxy address in operation 610 and the header destination's public-outside address for phone B is translated into the corresponding public-inside address in operation 612. As shown, the translated INVITE packet has a source address equal to A1 and a destination address equal to 172.1.1.1, which corresponds to phone B. The NAT-SBC also translates the payload's public-outside address for the creator (i.e., phone A) of such payload into a corresponding private address IP_A. Phone B will, accordingly, obtain phone A's private address IP_A in the payload. The Non-ALG NAT 104b then translates only the header so that it has a source address equal to A1 and a destination address equal to IP_B and forwards this translated packet to phone B.

In a step 4, phone B sends a Ringing packet having a source address equal to IP_B and a destination address equal to A1, as well as the private address IP_A for phone A in the payload towards the NAT-SBC. This Ringing packet has its header translated by the Non-ALG NAT 104b so that it contains a source address equal to 172.1.1.1 and a destination address equal to A1. The NAT SBC then translates the header destination from the internal proxy to the external proxy address in operation 606 and translates the header sources public-inside address into the corresponding public-outside address in operation 608.

The NAT SBC also translates the payload private address for the payload creator (i.e., phone A) into a corresponding public-outside address in operation 618. Accordingly, the Ringing packet sent out by the NAT SBC has a source address equal to 169.1.1.2, which corresponds to phone B, a destination address equal to A2 which corresponds to the registrar, and a public-outside address 169.1.1.1 in the payload which corresponds to phone A. This Ringing packet in step 4 corresponds to the Ringing packet that is received by phone A in step 2.

In step 5, phone B is ready to communicate and sends an OK packet having a source address equal to IP_B, a destination equal to A1, as well the private address for phone A and phone B in the form of IP_A and IP_B, respectively. The Non-ALG NAT 104B translates the header so that source address is equal to 172.1.1.1 and the destination address is equal to A1. The payload remains untranslated.

The NAT-SBC then receives this OK packet and translates the header in accordance with operations 606 and 608 of FIG. 6 and the payload in accordance with operation 618 of FIG. 6. Accordingly the OK packet has a source address equal to 169.1.1.2 and a destination address equal to A2, and public-outside addresses for both phone A and phone B which are equal to 169.1.1.1 and 169.1.1.2, respectively, which packet is received by the registrar.

The registrar then forwards this OK packet towards phone A as shown in FIG. 4A. The NAT SBC then translates the header and payload in accordance with operation 610, 612, and 620 of FIG. 6. Accordingly, the OK packet in step 6 output from the NAT-SBC has a source address equal to A1, and a destination address equal to 171.1.1.1 which corresponds to phone A, as well as private addresses for both phone A and phone B in the payload in the form of IP_A and IP_B, respectively. The Non-ALG NAT 104A then translates only the header so that the source address is equal to A1 and the destination address is equal to IP_A.

Phone A and phone B then know each other by their corresponding private addresses IP_A and IP_B. Thus, they communicate with each other using these private addresses. As shown in FIG. 4C, phone A sends a media packet in step 7 having a source address IP_A and destination address equal to IP_B towards phone B. Phone A's Non-ALG NAT 104a translates the source address from IP_A to 171.1.1.1. The Non-ALG NAT 104b of phone B receives this media packet and forwards it to phone B in accordance with normal routing procedures. Non-ALG NAT 104a of phone A is also aware of the destination address IP_B of phone B via conventional routing discovery mechanisms.

Turning to FIGS. 5A through 5C, the Flow-Through Mode will now be illustrated. Initially in step 1, phone A sends an INVITE packet having a source address equal to IP_A, a destination address equal to A1, and it's private address IP_A contained within the payload. The Non-ALG NAT 104a merely translates the header so that the source address is now 171.1.1.1 which corresponds to the public-inside address for phone A with respect to the NAT-SBC.

The NAT-SBC then translates the header destination from the internal proxy to the external proxy address in operation 606, so that it is translated from A1 into the address A2. The NAT-SBC also translates the header sources public-inside address 171.1.1.1 into the corresponding public-outside address 169.1.1.1 for phone A in operation 608.

In the Flow-Through Mode when the packet is going from the inside to the outside, the NAT-SBC also translates the payload's private address into the corresponding public-outside address while leaving any public addresses untranslated (if present in the payload) in operation 624. In the INVITE example of step 1, the payload contains the sender's (i.e., phone A is the sender) private address IP_A which is translated into the corresponding public-outside address 169.1.1.1 for the sender or phone A. In the remaining steps, translation of the header will not be explained since it is similar to the operations of FIGS. 4A-4C and merely the payload translations will be described. In the other inside to outside example, the SBC receives an OK packet having a private address for phone B and a public-outside address for phone A. In operation 624, the private address IP_B is translated to the corresponding public-outside address 169.1.1.1 while the public-outside address for phone A remains untranslated.

When the SBC receives a packet going from the outside to the inside, it translates the payload's public-outside address into the corresponding private address if the creator of such address (or payload portion) does not equal the sender of such packet in operation 626. Otherwise, the payload's public-outside address is left untranslated if the creator of such address is the same as the sender of such packet. The Trying/Ringing packet received in step 2 by the SBC contains a public-outside address 169.1.1.1 that was created by phone A but is being sent by phone B. Thus, the creator of this address does not equal the sender and will be translated into the corresponding private address in operation 626. Accordingly, the Trying and Ringing packet in step 2 sent out by the NAT-SBC contains a payload having a private address IP_A corresponding to phone A which corresponds to the creator of such address or payload portion.

Steps 3 illustrates another outside to inside packet example for payload translation handling by the SBC. In FIG. 5B, when the NAT-SBC receives the INVITE packet from the registrar that is destined for phone B in step 3, the public-outside address 169.1.1.1 remains untranslated since the creator of such address (phone A) is equal to the sender of the packet (phone A) in operation 626. Thus, the INVITE packet output from the NAT-SBC in step 3 has a public-outside address 169.1.1.1 for phone A in the payload. Phone B will then become aware of phone A's public-outside address.

In step 4, the Ringing packet sent by phone B contains a public-outside address 169.1.1.1 for phone A in the payload and is going from inside to outside. The NAT-SBC does not translate the payload address since it is a public address going from inside to outside in operation 624.

When phone B sends an OK packet in step 5, it will contain the public-outside address for phone A and a private address for itself. Thus, NAT-SBC will receive the OK packet for phone B having a public-outside address 169.1.1.1 for phone A and a private address IP_B for phone B in the payload. Since this packet is going from the inside to the outside, the payload's private address IP_B will be translated into the corresponding public outside address 169.1.1.2 while the public-outside address 169.1.1.1 will remain untranslated in operation 624.

When this OK packet is being returned to phone A and received by NAT-SBC in step 6, the payload contains the public-outside addresses for both phone A and phone B. In operation 626, since the creator of the public-outside address 169.1.1.1 does not equal the sender of this packet, this public-outside address is translated into the corresponding private address IP_A. Since the creator of the other public-inside address 169.1.1.2 does equal the sender of such packet, this address 169.1.1.2 remains untranslated as 169.1.1.2 for phone B. Accordingly, phone A is made aware of phone B's public outside address 169.1.1.2.

Phone A and phone B can then communicate using each other's public-outside addresses. As shown in FIG. 5C, phone A sends a media packet in step 7 having a source address equal to IP_A and a destination address equal 169.1.1.2, which corresponds to phone B's public-inside address. The Non-ALG NAT 104a for phone A then translates the private source address IP_A into a public-inside address 171.1.1.1 for phone A and leaves the destination public-outside address for phone B alone. The NAT-SBC then translates the public-inside source address 171.1.1.1 for phone A into the corresponding public-outside address 169.1.1.1 for phone A. The destination address for phone B is translated from public-outside address 169.1.1.2 to the public-inside address 171.1.1.2 for phone B, which is recognizable by the Non-ALG NAT 104b for phone B. The Non-ALG NAT 104b then translates the destination public-inside address 171.1.1.2 into a private address IP_B for phone B. These header translations of the SBC are illustrated by operations 606, 608, 612, and 612 of FIG. 6.

Generally, the techniques of the present invention for handling session data may be implemented on software and/or hardware. For example, these techniques can be implemented in an operating system kernel, in a separate user process, in a library package bound into network applications, on a specially constructed machine, or on a network interface card. In a specific embodiment of this invention, some of the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the data processing systems (e.g., host) may each be implemented on a general-purpose network host machine such as a personal computer or workstation. Further, the invention may be at least partially implemented on a card (e.g., an interface card) for a network device or a general-purpose computing device.

Figure 7:
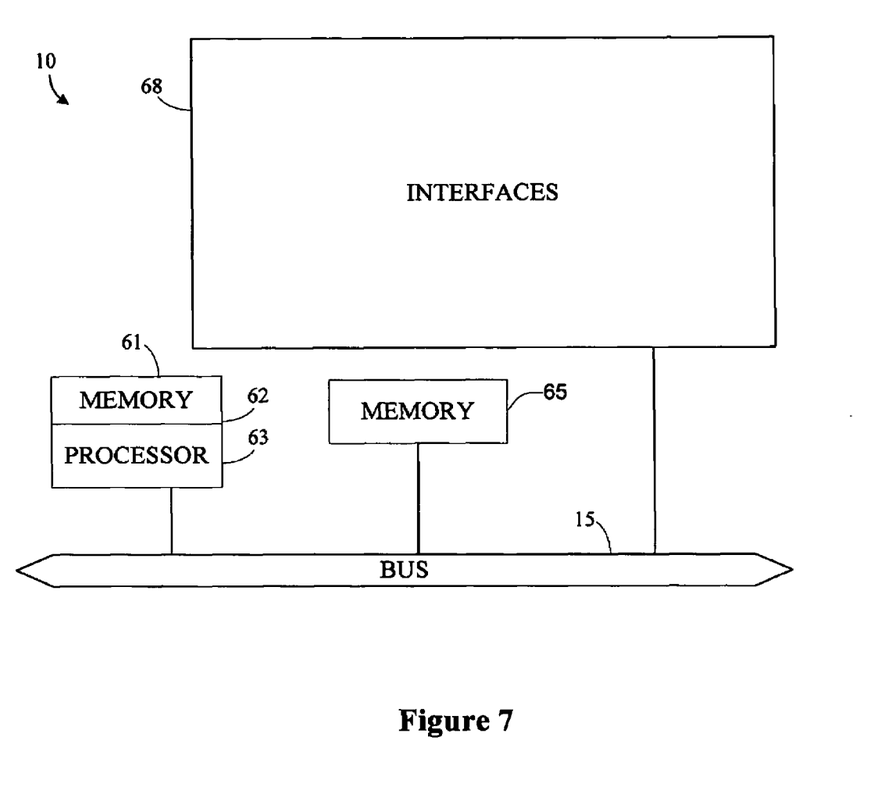
FIG. 7 is a diagrammatic representation of a router in which embodiments of the present invention may be implemented.

Referring now to FIG. 7, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for translation, binding formation and storage, etc. It preferably accomplishes all these functions under the control of software including an operating system (e.g., the Internetwork Operating System (IOS) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, bindings, Flow-Through and/or Flow-Around configurations, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for managing session data sent between nodes, comprising:
    (a) in an intermediary node, receiving a first register packet for setting up a call between endnodes sent from a first node to the intermediary node, wherein the first register packet includes a header having a first inside address that identifies the first node and a payload having a first private address that also identifies the first node and differs from the first inside address, wherein the first inside address was supplied by another intermediary node that translated the first register packet before such packet is received by a first intermediary node and the first private address is an Internet Protocol (IP) address of a private network of the first node;

(b) in the intermediary node, translating each of the first inside address of the header and a first private address of the payload into a same first outside address;

(c) in the intermediary node, translating a first proxy address of the header into a second proxy address, wherein the first proxy address is associated with the intermediary node and the second proxy address is associated with a registrar node for managing sessions between endnodes, wherein a binding between the first and second proxy addresses is configured at the intermediary node; and (d) without terminating and generating a session for such first register packet at the intermediary node, forwarding the first register packet from the intermediary node towards the registrar node after translating the header and translating the payload.

2. The method as recited in claim 1, wherein an untranslated portion of the payload of the first register packet remains unaltered when forwarded from the intermediary node to the registrar node.

3. The method as recited in claim 1, wherein the intermediary node is a session border controller (SBC).

4. The method as recited in claim 1, wherein a source address of the header of the first register packet is translated from the first inside address to the same first outside address whereby the first inside address was generated by a network address translation (NAT) device associated with the first node and the first outside address was obtained from a public address pool associated with the intermediary node and wherein a destination address of the header is translated from the first proxy address to the second proxy address, the method further comprising storing, at the intermediary node, a binding between the first private address, the first outside address, and the first inside address.

5. The method as recited in claim 4, further comprising:

(e) in the intermediary node, receiving an acknowledgement packet sent from the registrar node to the first node in response to the first register packet;

(f) in the intermediary node, translating a destination address of a header of the acknowledgement packet from the first outside address to the first inside address and a source address of the header of the acknowledgement packet from the second proxy address to the second proxy address;

(g) in the intermediary node, translating the first outside address in a payload of the acknowledgement packet into the first private address; and (h) without terminating and generating a session for such acknowledgement packet at the intermediary node, forwarding the acknowledgement packet from the intermediary node towards the first node after translating the header and the payload of the acknowledgement packet.

6. The method as recited in claim 5, further comprising:

in the intermediary node, receiving a second register packet sent from a second node to the intermediary node;

in the intermediary node, translating a second inside address of a header of the second register packet into a second outside address and translating the first proxy address of the header of the second register packet into the second proxy address;

in the intermediary node, translating a second private address of a payload of the second register packet into the second outside address, and wherein the second private address differs from the second outside address and the second inside address and the second private address, second outside address, and second inside address correspond to the second node; and without terminating and generating a session for such second register packet at the intermediary node, forwarding the second register packet from the intermediary node towards the registrar node after translating the header and the payload of the second register packet.

7. The method as recited in claim 5, wherein the first register packet includes an inside expiration field indicating an expiration time for the first node, the method further comprising:

at the intermediary node, providing an outside expiration time for the registrar node;

at the intermediary node, caching the acknowledgement packet;

when a subsequent register packet from the first node is received at the intermediary node, repeating operations (a) through (d) and only performing operation (e) for forwarding such subsequent register packet to the registrar node if a duration of time that has expired approaches the outside expiration time; and sending the cached acknowledgement packet back to the first node if operation (e) is not being performed for the subsequent register packet, wherein the outside expiration time of the cached acknowledgement is replaced with the inside expiration time prior to sending it to the first node.

8. The method as recited in claim 6, further comprising:

at the intermediary node, receiving a call flow packet that is being sent between the first and second nodes;

when the call flow packet is received into an inside interface of the intermediary node and destined for an outside interface of the intermediary node, translating a destination address of a header of the call flow packet from the first proxy address to the second proxy address and translating a source address of the call flow packet's header from a first or second inside address into a corresponding first or second outside address;

when the intermediary node is configured for flow around mode and the call flow packet is received into the inside interface of the intermediary node and destined for the outside interface of the intermediary node, translating a first and/or second private address of the call flow packet's payload into the corresponding first and/or second outside address;

when the intermediary node is configured for the flow around mode and the call flow packet is received into the outside interface of the intermediary node and destined for the inside interface of the intermediary node, translating a first and/or second outside address of the call flow packet's payload into the corresponding first and/or second private address;

when the intermediary node is configured for flow through mode and the call flow packet is received into the inside interface of the intermediary node and destined for the outside interface of the intermediary node, translating the first and/or second private address of the call flow packet's payload into a corresponding first and/or second outside address; and when the intermediary node is configured for the flow through mode and the call flow packet is received into the outside interface of the intermediary node and destined for the inside interface of the intermediary node, translating each of the first and/or second outside address of the call flow packet's payload into a corresponding first and/or second private address if a creator of the each address does not equal a sender of the call flow packet.

9. The method as recited in claim 1, wherein the first register packet is received via a network address translation (NAT) devices configured to translate an address of the header but not an address of the payload of such first register packet so as to result in the first inside address of the header differing from the first private address of the payload.

10. A computer system operable to manage session data sent between nodes, the computer system comprising:
one or more processors;
one or more memory, wherein at least one of the processors and memory are operable to perform the following operations:
  (a) in an intermediary node, receiving a first register packet for setting up a call between endnodes sent from a first node to the intermediary node, wherein the first register packet includes a header having a first inside address that identifies the first node and a payload having a first private address that also identifies the first node and differs from the first inside address, wherein the first inside address was supplied by another intermediary node that translated the first register packet before such packet is received by a first intermediary node and the first private address is an Internet Protocol (IP) address of a private network of the first node;
  (b) in the intermediary node, translating each of the first inside address of the header and the first private address of the payload into a same first outside address;
  (c) in the intermediary node, translating a first proxy address of the header into a second proxy address, wherein the first proxy address is associated with the intermediary node and the second proxy address is associated with a registrar node for managing sessions between the endnodes, wherein a binding between the first and second proxy addresses is configured at the intermediary node; and
  (d) without terminating and generating a session for such first register packet at the intermediary node, forwarding the first register packet from the intermediary node towards the registrar node after translating the header and translating the payload.

11. The computer system as recited in claim 10, wherein an untranslated portion of the payload of the first register packet remains unaltered when forwarded from the computer system to the registrar node.

12. The computer system as recited in claim 10 in the form of a session border controller (SBC).

13. The computer system as recited in claim 10, wherein a source address of the header of the first register packet is translated from the first inside address to the first outside address whereby the first inside address was generated by a network address translation (NAT) device associated with the first node and the first outside address was obtained from a public address pool associated with the computer system and wherein a destination address of the header of the first register packet is translated from the first proxy address to the second proxy address, wherein at least one of the processors and memory are further operable to store, at the computer system, a binding between the first private address, the first outside address, and the first inside address.

14. The computer system as recited in claim 13, wherein at least one of the processors and memory are further operable to:
  (e) receiv[ing]e an acknowledgement packet sent from the registrar device to the first node in response to the first register packet;
  (f) translat[ing]e a destination address of a header of the acknowledgement packet from the first outside address to the first inside address and a source address of the header of the acknowledgement packet from the second proxy address to the second proxy address;
  (g) translating the first outside address in a payload of the acknowledgement packet into the first private address; and
  (h) without terminating and generating a session for such acknowledgement packet at the computer system, forward[ing] the acknowledgement packet from the computer system towards the first node after translating the header and the payload of the acknowledgement packet.

15. The computer system as recited in claim 14, wherein at least one of the processors and memory are further operable to:
  receiv[ing]e a second register packet sent from a second node to the computer system;
  translat[ing]e a second inside address of a header of the second register packet into a second outside address and translating the first proxy address of the header of the second register packet into the second proxy address;
  translat[ing]e a second private address of a payload of the second register packet into the second outside address, and wherein the second private address differs from the second outside address and the second inside, public address and the second private address, second outside address, and second inside address correspond to the second node; and
  without terminating and generating a session for such second register packet at the computer system, forward[ing] the second register packet from the computer system towards the registrar node after translating the header and the payload of the second register packet.

16. The computer system as recited in claim 14, wherein the first register packet includes an inside expiration field indicating an expiration time for the first node, wherein at least one of the processors and memory are further operable to:
  provid[ing]e an outside expiration time for the registrar node;
  cach[ing] the acknowledgement packet;
  when a subsequent register packet is received at the computer system, repeat[ing] operations (a) through (d) and only performing operation (e) for forwarding such subsequent register packet to the registrar node if a duration of time that has expired approaches the outside expiration time; and
  send[ing] the cached acknowledgement packet back to the first node if operation (e) is not being performed for the subsequent register packet, wherein the outside expiration time of the cached acknowledgement is replaced with the inside expiration time prior to sending it to the first node.

17. The computer system as recited in claim 15, wherein at least one of the processors and memory are further operable to adapted for:
  receiv[ing] a call flow packet that is being sent between the first and second nodes;
  when the call flow packet is received into an inside interface of the computer system and destined for an outside interface of the computer system, translat[ing]e a destination address of a header of the call flow packet from the first proxy address to the second proxy address and translating a source address of the call flow packet's header from a first or second inside address into a corresponding first or second outside address;

when the computer system is configured for flow around mode and the call flow packet received is received into the inside interface of the computer system and destined for the outside interface of the computer system, translat[ing]e a first and/or second private address of the call flow packet's payload into a corresponding first and/or second outside address;

when the computer system is configured for the flow around mode and the call flow packet received is received into the outside interface of the computer system and destined for the inside interface of the computer system, translat[ing]e a first and/or second outside address of the call flow packet's payload into the corresponding first and/or second private address;

when the computer system is configured for flow through mode and the call flow packet is received into the inside interface of the computer system and destined for the outside interface of the computer system, translat[ing]e the first and/or second private address of the call flow packet's payload into a corresponding first and/or second outside address; and when the computer system is configured for the flow through mode and the call flow packet is received into the outside interface of the computer system and destined for the inside interface of the computer system, translat[ing]e each of the first and/or second outside address of the call flow packet's payload into a corresponding first and/or second private address if a creator of the each address does not equal a sender of the call flow packet.

18. The computer system as recited in claim 10, wherein the first register packet is received via a network address translation (NAT) devices configured to translate an address of the header but not an address of the payload of such first register packet so as to result in the first inside address of the header differing from the first private address of the payload.

19. A computer program product for managing session data sent between nodes, the computer program product comprising:
   at least one non-transitory computer readable storage medium in the form of magnetic media, optical media, or magneto-optical media;
   computer program instructions stored within the at least one computer readable product configured for:
      in an intermediary node, receiving a first register packet sent for setting up a call between endnodes from a first node to the intermediary node, wherein the first register packet includes a header having a first inside address that identifies the first node and a payload having a first private address that also identifies the first node and differs from the first inside address, wherein the first inside address was supplied by another intermediary node that translated the first register packet before such packet is received by the first intermediary node and the first private address is an Internet Protocol (IP) address of a private network of the first node;
      in the intermediary node, translating each of the first inside address of the header and the first private address of the payload into a same first outside address;
      in the intermediary node, translating a first proxy address of the header into a second proxy address, wherein the first proxy address is associated with the intermediary node and the second proxy address is associated with a registrar node for managing sessions between endnodes, wherein a binding between the first and second proxy addresses is configured at the intermediary node; and
      without terminating and generating a session for such first register packet at the intermediary node, forwarding the first register packet from the intermediary node towards the registrar node after translating the header and translating the payload.

* * * * *